United States Patent
Guegan et al.

(10) Patent No.: US 12,161,258 B2
(45) Date of Patent: Dec. 10, 2024

(54) COOKING VESSEL COMPRISING AN AUDIBLE-ALERT BIMETALLIC ELEMENT

(71) Applicant: SEB S.A., Ecully (FR)

(72) Inventors: Laurent Guegan, Lornay (FR); Sassi Bezzi, Seynod (FR); Olivier Billoud, Cruet (FR); Fabien Inclair, Bellecombe en Bauges (FR)

(73) Assignee: SEB S.A. (FR)

( * ) Notice: Subject to any disclaimer, the term of this patent is extended or adjusted under 35 U.S.C. 154(b) by 909 days.

(21) Appl. No.: 17/058,386

(22) PCT Filed: May 9, 2019

(86) PCT No.: PCT/EP2019/061958
§ 371 (c)(1),
(2) Date: Nov. 24, 2020

(87) PCT Pub. No.: WO2019/224011
PCT Pub. Date: Nov. 28, 2019

(65) Prior Publication Data
US 2021/0204752 A1    Jul. 8, 2021

(30) Foreign Application Priority Data
May 25, 2018   (FR) ........................ 1854446

(51) Int. Cl.
*A47J 36/02*     (2006.01)
*A47J 27/00*     (2006.01)
(Continued)

(52) U.S. Cl.
CPC ............ *A47J 36/02* (2013.01); *A47J 27/002* (2013.01); *A47J 37/10* (2013.01); *A47J 27/09* (2013.01); *A47J 2202/00* (2013.01); *G08B 3/02* (2013.01)

(58) Field of Classification Search
CPC .. A47J 37/10; A47J 36/02; A47J 27/08; A47J 27/09; A47J 2202/00; G08B 3/00; G08B 3/02; G08B 17/06
(Continued)

(56) References Cited

U.S. PATENT DOCUMENTS 3,418,963 A * 12/1968 Copeland ................. G01K 5/62
                                                        116/102
3,916,818 A * 11/1975 Barr ........................ G01L 19/12
                                                        126/388.1
(Continued)

FOREIGN PATENT DOCUMENTS

CN         2593703 Y     12/2003
CN      201929758 U      8/2011
(Continued)

OTHER PUBLICATIONS

International Search Report for Application No. PCT/EP2019/061958 mailed Jun. 14, 2019, 3 pages.
(Continued)

*Primary Examiner* — Reginald Alexander
(74) *Attorney, Agent, or Firm* — Lerner David LLP

(57) ABSTRACT

The invention relates to a cooking vessel (1) comprising a cap (2) equipped with an end wall (3). According to the invention, the end wall (3) comprises a housing (6) accommodating at least one bimetallic element (30a, 30b) that adopts a cold stable first position when the temperature is below a predetermined temperature and toggles into a hot stable second position when the temperature is above the predetermined temperature, and vice versa, the transition from the first stable position to the second stable position generating an audible signal designed to be perceived by a user or by an external device.

13 Claims, 3 Drawing Sheets

(51) Int. Cl.
*A47J 37/10* (2006.01)
*A47J 27/09* (2006.01)
*G08B 3/02* (2006.01)

(58) Field of Classification Search
USPC ......... 99/285; 222/475.1; 116/101, 102, 103
See application file for complete search history.

(56) References Cited

U.S. PATENT DOCUMENTS

| | | | |
|---|---|---|---|
| 4,503,800 A * | 3/1985 | Schliep | ................... F24B 1/028 |
| | | | 116/152 |
| 5,265,522 A | 11/1993 | Schultz | |
| 2005/0235509 A1 | 10/2005 | Heath | |
| 2007/0095215 A1 | 5/2007 | Ho et al. | |
| 2016/0198882 A1 | 7/2016 | Linglin | |
| 2016/0316968 A1 | 11/2016 | Linglin | |
| 2017/0231415 A1 | 8/2017 | Cheng et al. | |
| 2018/0116457 A1 | 5/2018 | Mills et al. | |

FOREIGN PATENT DOCUMENTS

| | | | | |
|---|---|---|---|---|
| CN | 105142473 A | 12/2015 | | |
| CN | 206306040 U | 7/2017 | | |
| CN | 206761333 U | 12/2017 | | |
| DE | 20303311 U1 | 6/2003 | | |
| DE | 202016107466 U1 | 9/2017 | | |
| EP | 364684 A1 | 4/1990 | | |
| FR | 3033995 A1 | 9/2016 | | |
| GB | 668619 A | 3/1952 | | |
| JP | S5019771 U | 3/1975 | | |
| JP | S5236779 Y2 | 8/1977 | | |
| JP | S55134326 A | 10/1980 | | |
| JP | 3008422 U | 3/1995 | | |
| JP | H07148069 A | 6/1995 | | |
| JP | 3201143 B2 | 8/2001 | | |
| JP | 2001321269 A | 11/2001 | | |
| JP | 2003219969 A | 8/2003 | | |
| JP | 2003332033 A | 11/2003 | | |
| JP | 2004020817 A | 1/2004 | | |
| JP | 3177273 U | 7/2012 | | |
| JP | 3201143 U * | 11/2015 | ............... G08B 3/00 |
| JP | 2016534834 A | 11/2016 | | |
| JP | 2016220786 A | 12/2016 | | |

OTHER PUBLICATIONS

Search Report dated Sep. 19, 2022 from Office Action for Chinese Application No. 2019800338184 issued Sep. 27, 2022. 4 pgs.
Search Report dated Apr. 24, 2022 from Office Action for Chinese Application No. 2019800338184 issued Apr. 28, 2023. 2 pgs.

* cited by examiner

COOKING VESSEL COMPRISING AN AUDIBLE-ALERT BIMETALLIC ELEMENT

CROSS REFERENCE TO RELATED APPLICATIONS

The present application is a national phase entry under 35 U.S.C. § 371 of International Application No. PCT/EP2019/061958 filed May 9, 2019, published in French, which claims priority from French Patent Application No. 1854446 filed May 25, 2018, all of which are incorporated herein by reference.

This invention relates to a cooking vessel intended to be placed on a hotplate, burner, or similar device for cooking food, in particular a frying pan, saucepan, sauté pan, stewpot or pressure cooker, and more particularly a cooking vessel provided with a cap comprising a sensor, specifically a temperature sensor.

A temperature alert device installed on the bottom of a cooking vessel sounding when a pre-determined temperature is reached during preheating, is known from document JP3201143. The device consists of a bimetallic element taking a first stable cold position when the temperature is below a predetermined temperature and toggling to a second stable warm position when the temperature is above the predetermined temperature. The toggling of the bimetallic element releases a hammer that strikes a bell to emit an audible signal designed to be perceived by the user.

However, the proper functioning of the alert device depends on the quality of the thermal exchange in the bottom of the cooking vessel, in particular the evenness of the bottom.

What is more, if the user places a food item, for example fat into the cooking vessel, the food may lodge itself between the bottom of the cooking vessel and the support face of the device, and thus disrupt the toggling of the bimetallic element.

It can also be observed that the alert device has a complicated construction.

The objective of this invention is to remedy the aforementioned drawbacks and to propose a cooking vessel with a predetermined temperature achievement alert device with a reliable and repetitive operation that is durable over time.

Another objective of the invention is to propose a cooking vessel comprising a pre-determined temperature achievement alert device with a simple design which is economical to install.

These objectives are achieved with a cooking vessel comprising a cap equipped with an end wall, characterized in that the bottom comprises a housing accommodating at least one bimetallic element adopting a cold stable first position when the temperature is lower than a predetermined temperature and toggling to a hot stable second position when the temperature is higher than the predetermined temperature and vice versa, the transition from the first stable position to the second stable position generating an audible signal designed to be perceived by a user or by an external device.

The at least one bimetallic element is integrated into the bottom of the cooking vessel to form an audible alert device when a predetermined temperature is reached. Thus the audible alert device cannot be removed from the cooking vessel and be lost or misplaced. The audible alert device functions autonomously, without the user's intervention.

In addition, the at least one bimetallic element is installed in the bulk of the bottom, at a location which is most representative of the bottom temperature.

From the fact that the at least one bimetallic element toggles from the cold stable first position to the hot stable second position, it is understood that the position change takes place abruptly, within a short period of time. Therefore, the audible signal is short but loud.

During the transition, the bimetallic element strikes at least one wall of the receiver housing to emit the audible signal.

Advantageously, the at least one bimetallic element emits an audible signal with a sound level of between 65 and 75 dB, preferably 69 dB.

Preferably, the predetermined temperature at which the at least one bimetallic element toggles from the cold stable first position to the hot stable second position falls between 220 and 260° C., preferably 230° C.

Said predetermined temperature corresponds to an overcooking temperature of the food to be prepared which leads to a risk of burning of the food and a risk of overheating of the cooking vessel, especially if the bottom has a non-stick PTFE type coating.

Advantageously, the at least one bimetallic element moves freely within the housing.

Thus, during the transition from the cold stable first position to the hot stable second position, the bimetallic element strikes against the walls of the housing to emit an audible signal.

The at least one bimetallic element preferably has the shape of part of a sphere.

To obtain this shape, a disc of diameter D is cut from a sheet consisting of two layers of two materials with different expansion coefficients and the disc is pressed so that the at least one bimetallic element takes the shape of part of a sphere of height H.

Thus, in the cold stable first position, the at least one bimetallic element takes the form of part of a sphere curved in one direction and in the hot stable second position, the at least one bimetallic element takes the form of part of a sphere curved in the opposite direction.

The applicant has shown that with such a shape for the bimetallic element, the toggling from the cold stable first position to the hot stable second position takes place abruptly, in a very short time.

Advantageously, the bottom comprises at least two bimetallic elements toggling from their cold stable first position to their hot stable second position at two different predetermined temperatures.

Thus the audible alert device can emit two successive audible signals, when a first predetermined temperature is reached upon which a first bimetallic element toggles, then when a second predetermined temperature is reached upon which a second bimetallic element toggles.

Advantageously, the first predetermined temperature at which the first bimetallic element toggles falls between 220 and 240° C., preferably 230° C., and the second predetermined temperature at which the second bimetallic element toggles falls between 240 and 260° C., preferably 250° C.

The at least two bimetallic elements are preferably installed within the same housing.

Advantageously, the housing is formed by a cavity covered with a plate.

This arrangement makes it possible to create a closed cavity acting as a resonance chamber.

Advantageously, the plate has a thickness of between 0.5 and 2 mm.

The applicant has shown that such a thickness allows amplification of the audible signal generated by the toggling of the bimetallic element.

Advantageously, the plate is made of aluminum.

The plate is preferably installed on the underside of the bottom.

Thus, the plate is affixed to the lower surface with fastening devices so that the upper surface of the bottom intended to receive food, is left uniform and smooth.

Advantageously, the plate has a peripheral edge extending perpendicularly to the plate, the peripheral edge having a hook intended to engage with an area of the cavity comprising an undercut profile.

Thus, the plate assembly is performed by a simple clipping action.

Preferably, the plate is fixed onto the bottom by means of welding.

Such an arrangement makes it possible to install the plate on the lower surface of the bottom or on an upper surface of the bottom, especially under a layer of non-stick coating.

Advantageously, the plate has perforations and the bottom has studs, the purpose of the perforations being that they are assembled onto the studs in order to affix the plate to the bottom through a stamping operation.

The studs make it possible to crimp the perforated plate onto the bottom by stamping it using a press delivering a tonnage small enough not to deform the housing.

Advantageously, the plate has hooking perforations with an inclined inner edge, so that the plate is recessed into the bottom through a striking action so that the hooking perforations are filled with the bottom material.

This arrangement allows attaching the plate to the bottom in a single stamping operation.

The cavity preferably has a wall with an internal thread and the wall has an external threaded edge, the plate being assembled in the cavity by screwing.

Advantageously, the cooking vessel is a frying pan, a saucepan, a sauté pan, a stew pot, or a pressure cooker.

The preferred external device is a smartphone.

Thus the smartphone includes a dedicated application that captures the audible signal caused by the toggling of the bimetallic element to provide information of additional signals to the user.

The invention will be better understood from the study of an exemplary embodiment, which should be taken without any limitation, and illustrated in the attached figures.

Figure 1:
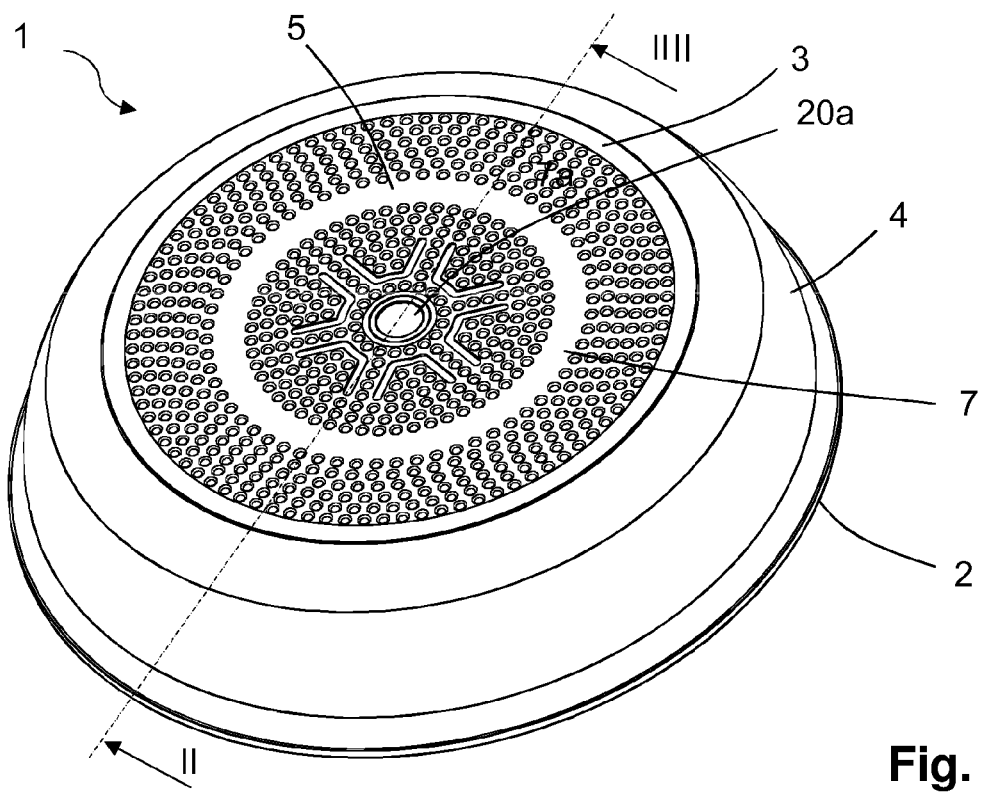
FIG. 1 illustrates a perspective view of a cooking vessel according to a first embodiment of the invention.
Figure 2A:
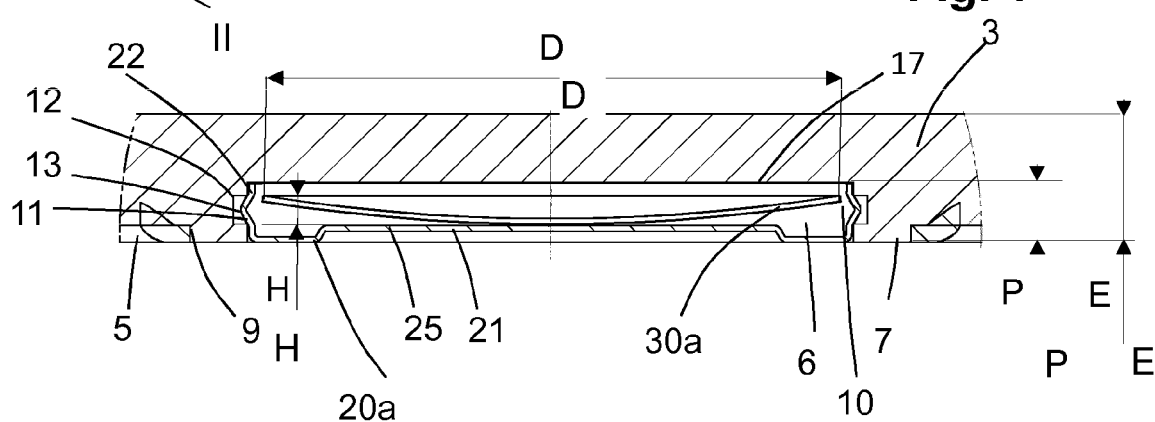
FIG. 2a illustrates a detailed sectional view along line II-II of the cooking vessel in FIG. 1, with the bimetallic element in the cold stable first position.
Figure 2B:
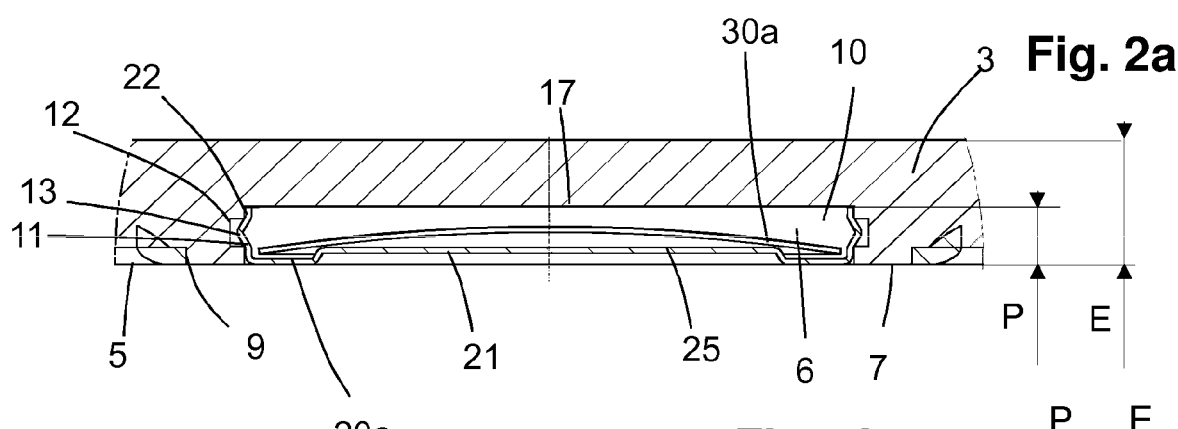
FIG. 2b illustrates a detailed sectional view along line II-II of the cooking vessel in FIG. 1, with the bimetallic element in the hot stable second position.
Figure 3:
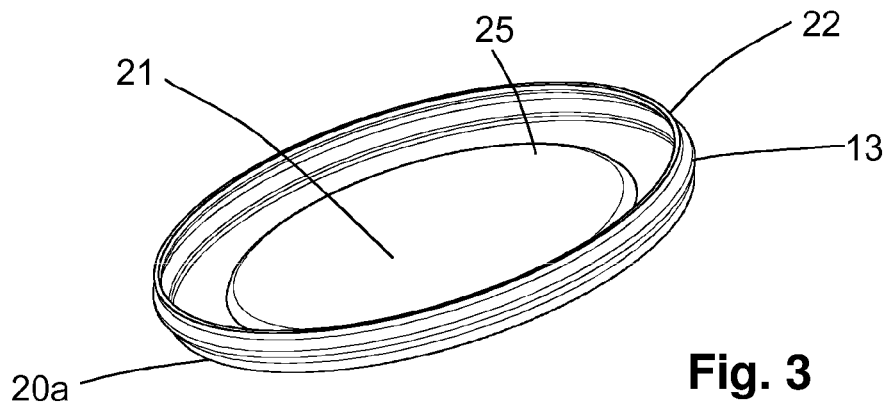
FIG. 3 illustrates a perspective view of the plate of the cooking vessel in FIG. 1.

It should be noted that in this document, the terms "horizontal", "vertical", "lower", "upper", "longitudinal", "transverse", "top", "bottom", used to describe the cooking vessel, refer to the cooking vessel during use, when placed on a horizontal plane.

As can be seen in FIGS. 1 to 7, a cooking vessel 1 has a cap 2 comprising a bottom 3 and a side wall 4. Cap 2 is made of aluminum, for example by stamping a disc or by casting. The bottom 3 comprises a perforated metallic plate 5 attached by striking it onto the bottom 3. The metallic plate 5 is made of ferromagnetic stainless steel to ensure compatibility with induction heating. Cooking vessel 1 has a handle (not shown in the figures) that extends radially to cap 2 in a longitudinal direction. The handle is attached to side wall 4 of cap 2 by means of fasteners.

The bottom 3 has thickness E in which housing 6 is placed to accommodate a bimetallic element 30a, 30b. Housing 6 is placed in the middle of bottom 3, on the underside 7 of bottom 3. Housing 6 is positioned inside a circular clearance 9 of the perforated metal plate 5. Housing 6 comprises a cylindrical cavity 10 with depth P, closed by a plate 20a, 20b, 20c, 20d. Housing 6 has an upper wall 17 and a lower wall 25 belonging to plate 20a, 20b, 20c, 20d. Advantageously, the ratio of the depth P of cavity 10 to the thickness E of bottom 3 is less than 0.5. As an example, the cavity has a depth P equal to 1.5 mm, the bottom 3 has a thickness that can vary from 3.5 to 10 mm.

The bimetallic element 30a, 30b has a cold stable first position (FIG. 2a) when the temperature is below a predetermined temperature and toggles to a warm stable second position (FIG. 2b) when the temperature is above the predetermined temperature and vice versa. The transition from the first stable position to the second stable position generates an audible sound, the frequency and audible level of which is designed to be perceived by a user or an external device. The bimetallic element 30a, 30b strikes the upper wall 17 and the lower wall 25 of housing 6 to emit an audible signal. Advantageously, bimetallic element 30a is calibrated so that the predetermined toggling temperature corresponds to an overcooking temperature of the food to be prepared which could lead to burning of the food and overheating of the cooking vessel, especially if the bottom has a non-stick coating of the PTFE type.

In the illustrated embodiments, bimetallic element 30a, 30b has the form of a downwardly curved part of a sphere in the cold stable first position (FIG. 2a) and bimetallic element 30a, 30b has the form of an upwardly curved part of a sphere in the hot stable second position. To obtain this form, a disc of diameter D is cut from a sheet consisting of two layers of two materials with different expansion coefficients. Preferably, the diameter of the disc should be between 20 and 40 mm and the thickness of the disc between 0.2 and 0.35 mm. The disc is then stamped so that bimetallic element 30a, 30b is shaped as part of a sphere with height H.

Closing plate 20a, 20b, 20c, 20d has a circular central part 21 with a diameter slightly larger than the diameter D of the disc constituting bimetallic element 30a, 30b. Plate 20a, 20b, 20c, 20d is preferably made of aluminum with a thickness of between 0.5 and 2 mm.

In the first embodiment illustrated in FIGS. 1 to 4, closing plate 20a has a peripheral border 22 extending perpendicularly to plate 20a. Cavity 10 has a side wall 11 into which a groove 12 is made. Peripheral border 22 has a hooking part formed by an external radial protrusion 13 intended to engage with groove 12. Plate 20a is force-fitted into cavity 10, by pushing plate 20a until the external radial protrusion locks into groove 12.

Figure 4:
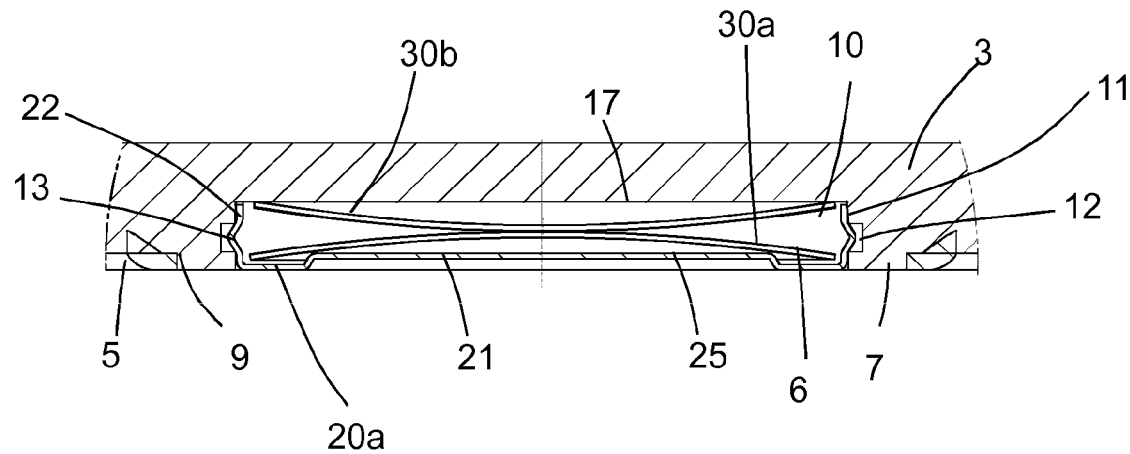
FIG. 4 illustrates a detailed sectional view along line II-II of the cooking vessel in FIG. 1, the cooking vessel comprising two bimetallic elements.

As shown in FIG. 4, housing 6 accommodates first bimetallic element 30a and second bimetallic elements 30b toggling from their cold stable first position to their hot stable second position respectively at the first and second predetermined temperatures. Advantageously, the first predetermined temperature at which the first bimetallic element 30a toggles, is slightly lower than the second predetermined temperature at which the second bimetallic element 30b toggles, for example, the first predetermined temperature falls between 220 and 240° C., preferably 230° C., and the second predetermined temperature falls between 240 and 260° C., preferably 250° C. The second predetermined temperature corresponds to the maximum temperature that should not be exceeded, in particular to preserve a non-stick coating arranged on the upper side of the bottom.

Thus, when preheating cooking vessel 1, a first audible signal indicating that the first predetermined temperature was reached, is emitted by the first bimetallic element 30a, corresponding to the introduction of the food (FIG. 4) and, in case the user has not heard the first signal, a second audible signal indicating that the second predetermined temperature was reached, is emitted by the second bimetallic element 30b to invite the user to lower the heating power.

Figure 5:
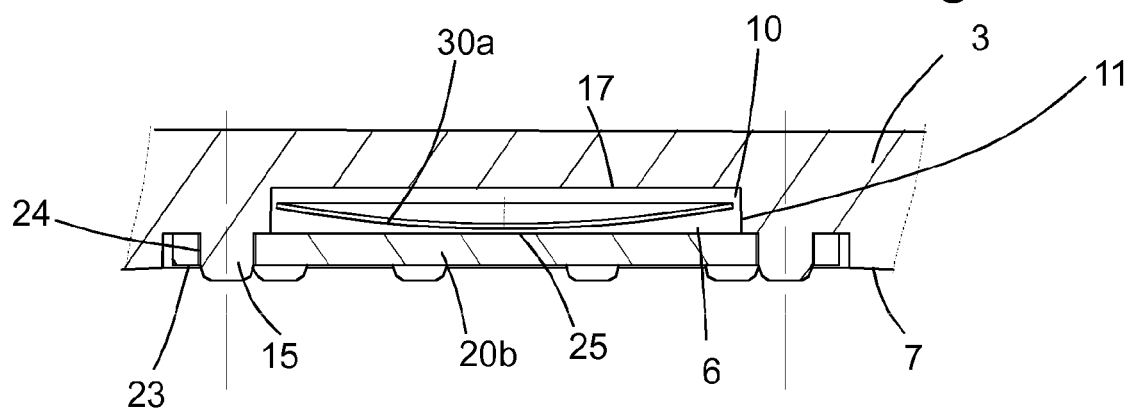
FIG. 5 illustrates a detailed sectional view of the cooking vessel in FIG. 1 according to the second embodiment of the invention.

In the second embodiment illustrated in FIG. 5, plate 20b has an outer edge 23 with perforations 24 and the bottom 3 has studs 15. The perforations 24 are intended to be assembled onto the studs 15 (FIG. 5). A stamping operation to deform the studs 15 makes it possible to crimp plate 20b onto the bottom 3.

If cap 2 is made by stamping an aluminum disc, cavity 10 and studs 15 can be achieved through the stamping operation. If cap 2 is made through a casting operation, cavity 10 and studs 15 can be created directly in the mold.

Figure 6:
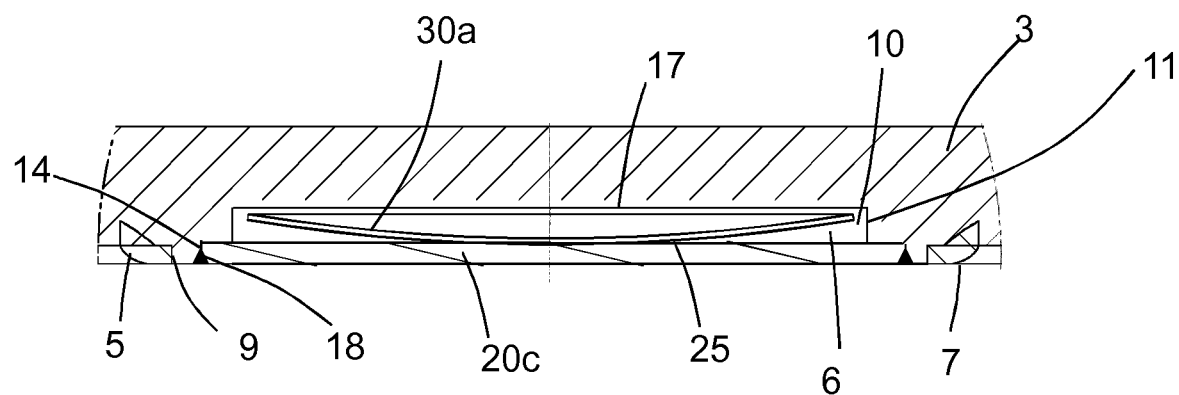
FIG. 6 illustrates a detailed sectional view of the cooking vessel of FIG. 1 according to a third embodiment of the invention.
Figure 7:
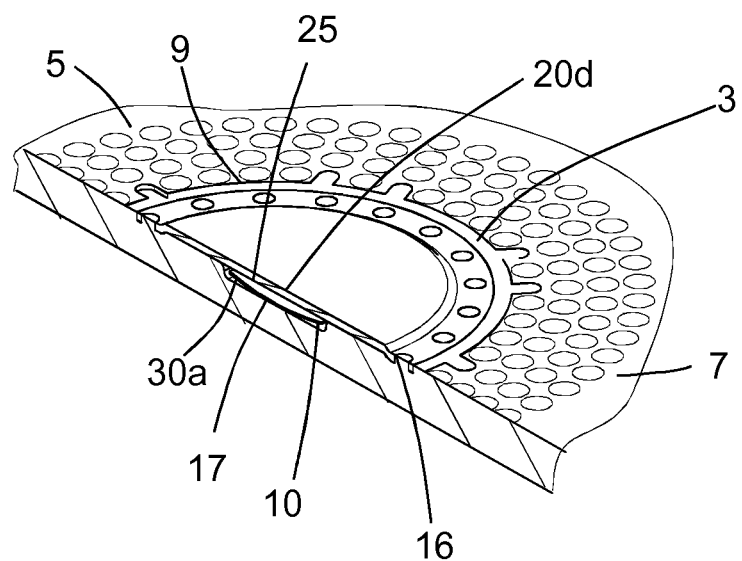
FIG. 7 illustrates a detailed sectional view and a perspective view of the cooking vessel of FIG. 1 according to a fourth embodiment of the invention.

In a third embodiment illustrated in FIG. 6, cavity 10 has a shoulder 14 intended to receive plate 20c which takes the form of a disc. Plate 20c is affixed to bottom 3 by a welding operation, including a laser welding operation, a TIG (Tungsten Inert Gas) welding operation or a MIG (Metal Inert Gas) welding operation. The welding operation forms weld bead 18 between bottom 3 and plate 20c.

In a fourth embodiment, plate 20d has 16 hooking perforations. Plate 20d is intended to be recessed into bottom 3 by a stamping operation so that the hook holes 16 are filled with material from the bottom 3. Advantageously, the hook perforations 16 include a slanted inner edge.

In one variation of the embodiment, the user is assisted by a device external to the cooking vessel, e.g. a smartphone. The user can initiate a dedicated application on the smartphone which should be left close to the hob. When the bottom reaches the predetermined temperature, the bimetallic element emits an audible signal which is perceived by the smartphone. The smartphone then relays this information via an alarm which the user must deactivate. Thus, if the user were momentarily absent when the audible signal was emitted, this alarm would still alert them to the fact that the temperature has been exceeded.

When understood correctly, the invention is not in any way limited to the embodiments described and illustrated, since these embodiments were only provided by way of example. It is still possible to make amendments, specifically in terms of the way in which the various elements are composed or in terms of substituting equivalent techniques, provided that they remain within the scope of the invention.

Thus, in one embodiment variation, the cavity has a wall with an internal thread and the wall has an external threaded edge, the plate being assembled in the cavity by screwing.

In another embodiment variation, the cooking vessel is created by the removable bowl of an electric rice cooker.

The invention claimed is:

1. A cooking vessel comprising:
    a cap equipped with a bottom,
    wherein the bottom comprises a housing accommodating at least one bimetallic element taking a cold stable first position when the temperature is below a predetermined temperature and toggling to a hot stable second position when the temperature is above the predetermined temperature and vice versa, the transition from the first stable position to the second stable position generating an audible signal configured to be perceived by a user, and
    wherein the at least one bimetallic element is configured to strike a first portion of at least one wall of the housing and a second portion of the at least one wall of the housing to emit the audible signal.

2. The cooking vessel according to claim 1, wherein the at least one bimetallic element moves freely within the housing.

3. The cooking vessel according to claim 1, wherein the at least one bimetallic element takes the form of part of a sphere.

4. The cooking vessel according to claim 1, wherein the at least one bimetallic element comprises at least two bimetallic elements toggling from their cold stable first position to their hot stable second position at two different predetermined temperatures.

5. The cooking vessel according to claim 1, wherein the housing is formed by a cavity closed by a plate.

6. The cooking vessel according to claim 5, wherein the plate is placed on an underside of the bottom.

7. The cooking vessel according to claim 5, wherein the plate has a peripheral edge extending perpendicularly to the plate, the peripheral edge having a hooked portion configured to engage with a zone of the cavity which comprises an undercut profile.

8. The cooking vessel according to claim 5, wherein the plate has perforations and the bottom has studs, the perforations configured to be assembled onto the studs to affix the plate to the bottom through a stamping operation.

9. The cooking vessel according to claim 5, wherein the plate is affixed to the bottom by a welding operation.

10. The cooking vessel according to claim 5, wherein the plate has hooking perforations, and is configured to be embedded in the bottom by a stamping operation so that the hooking perforations are filled with a material of the bottom.

11. The cooking vessel according to claim 1, wherein the cooking vessel is a frying pan, saucepan, sauté pot, stewpot, or pressure cooker.

12. The cooking vessel according to claim 1, wherein the user includes a smartphone.

13. A cooking vessel comprising:
    a cap equipped with a bottom,
    wherein the bottom comprises a housing accommodating at least one bimetallic element taking a cold stable first position when the temperature is below a predetermined temperature and toggling to a hot stable second position when the temperature is above the predetermined temperature and vice versa, the transition from the first stable position to the second stable position generating an audible signal configured to be perceived by a user, the at least one bimetallic element striking at least one wall of the housing to emit the audible signal, and wherein the at least one bimetallic element comprises at least two bimetallic elements toggling from their cold stable first position to their hot stable second position at two different predetermined temperatures.

* * * * *